No. 773,293. Patented October 25, 1904.

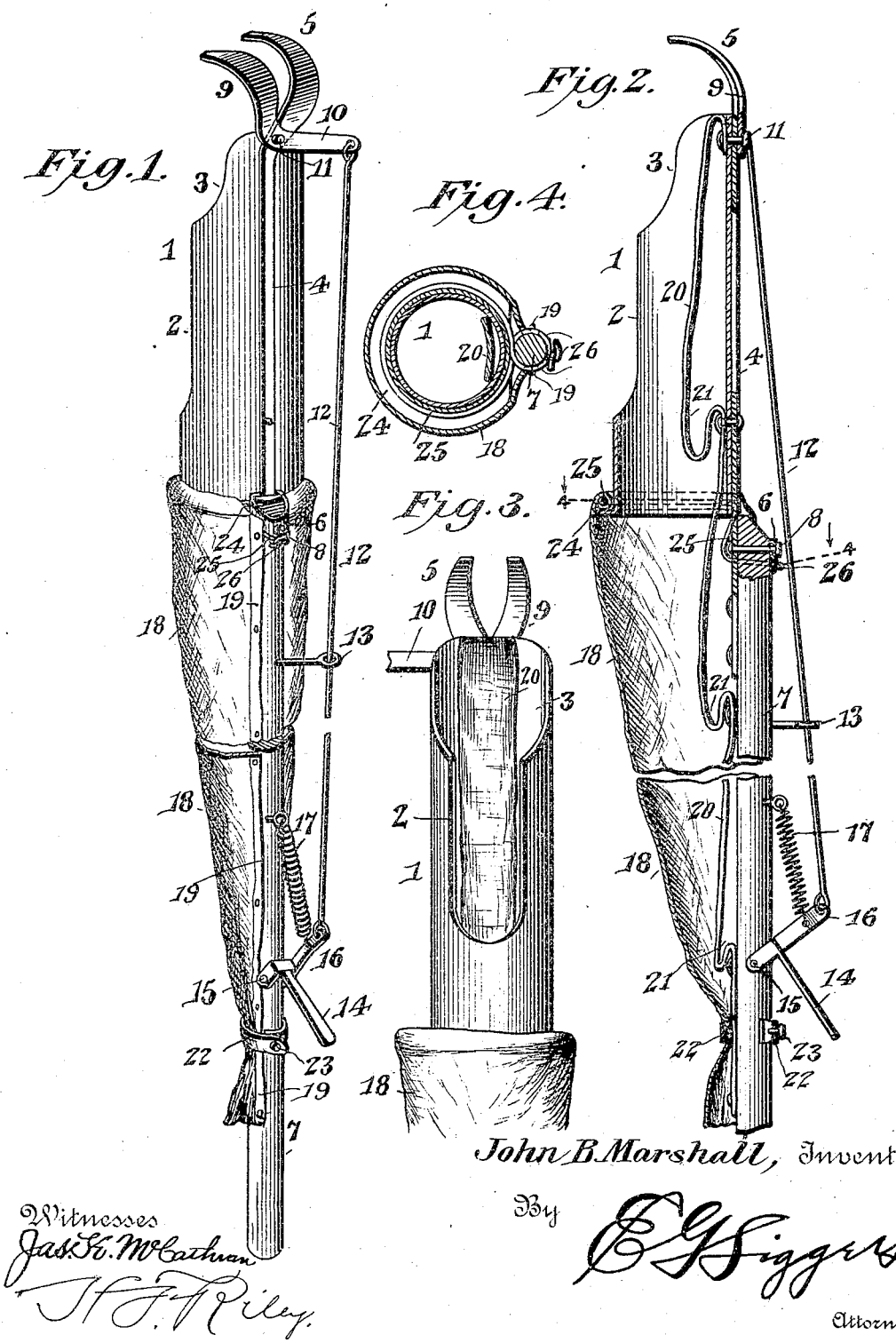

UNITED STATES PATENT OFFICE.

JOHN B. MARSHALL, OF FRESNO, CALIFORNIA.

FRUIT-PICKER.

SPECIFICATION forming part of Letters Patent No. 773,293, dated October 25, 1904.

Application filed January 27, 1904. Serial No. 190,817. (No model.)

*To all whom it may concern:*

Be it known that I, JOHN B. MARSHALL, a citizen of the United States, residing at Fresno, in the county of Fresno and State of California, have invented a new and useful Fruit-Picker, of which the following is a specification.

The invention relates to improvements in fruit-pickers.

The object of the present invention is to improve the construction of fruit-pickers and to provide a simple, inexpensive, and efficient device of this character capable of enabling fruit to be readily picked from a tree without bruising or otherwise injuring the fruit.

A further object of the invention is to provide a fruit-picker having a chute adapted to guide the fruit to the ground or to a receptacle and capable of being readily closed at its lower end, whereby it is adapted to serve as a receptacle for the picked fruit and is capable of readily discharging the same when desired.

With these and other objects in view the invention consists in the construction and novel combination and arrangements of parts, hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a perspective view of a fruit-picker constructed in accordance with this invention. Fig. 2 is a longitudinal sectional view of the same. Fig. 3 is a detail view of the tubular receiver. Fig. 4 is a transverse sectional view on the line 4 4 of Fig. 2.

Like numerals of reference designate corresponding parts in all the figures of the drawings.

1 designates a tubular receiver provided at its front with a slot or opening 2, extending from its lower portion to its upper end and widened at its upper end at 3 and adapted to receive the fruit which is gathered by the device. Secured to the back of the tubular receiver is a longitudinal bar 4, having a fixed blade 5 at its upper end and provided at its lower end with a sleeve 6, which is arranged on the upper end of a rod or pole 7. The sleeve is secured to the rod or pole 7 by a bolt 8 or other suitable fastening device, whereby the receiver is mounted on the said rod or pole. The rod or pole, which is preferably constructed of wood, may be of any desired length, as will be readily understood, the fruit-gatherer being designed to be of sufficient length to enable a person standing on the ground to reach fruit at the tops of trees. The fixed blade is curved forwardly, and it coöperates with a pivoted blade 9, having an arm 10, which extends outward transversely of the receiver at substantially right angles thereto when the blades are opened and in the position illustrated in Fig. 1 of the drawings. The pivot 11 of the blade 9 is arranged at the inner end of the arm, the other end of which is connected with the upper end of a rod 12, passing through a suitable guide or guides 13 and connected at its lower end with a bell-crank lever 14. The bell-crank lever 14 consists of a longitudinal arm provided at its inner or upper end with a yoke which straddles the back of the rod or pole and which is pivoted to the same by a transverse pin 15. One side of the yoke is extended and bent backward to form an arm 16, which is connected with the lower end of the rod 12. A coiled spring 17 is also connected with the arm 16 and is secured to the rod or pole, as clearly shown in Figs. 1 and 2. The coiled spring is adapted to lift the rod and open the pivoted blade, whereby the cutting device is normally held in position for severing fruit. When the longitudinal arm of the bell-crank lever is swung downward or inward, the pivoted blade is closed and the two blades are adapted to readily sever fruit from a tree.

The fruit-gatherer is provided with a flexible chute 18, constructed, preferably, of a suitable fabric and secured at its longitudinal edges 19 to opposite sides of the rod or pole by suitable fastening devices, as shown, whereby the rod or pole is adapted to form the rear wall of the chute. The rod or pole has mounted on it a fabric cushioning-strip 20, which is plaited or otherwise arranged to form loops 21, and these loops, which partially constrict the chute, yieldably receive the fruit and cushion the same in its descent in the chute. By this construction the fruit is effectually prevented from being bruised or otherwise injured by the device. The flexible cushioning-strip is also extended into the receiver, as shown, and it forms a rear lining or cushion for the same.

The chute may be employed for directing the fruit into a basket or other receptacle; but in order to enable the device to be more conveniently handled and to prevent the fruit from falling upon the ground a flexible strap 22 is provided and is adapted to encircle the rod or pole and the lower end portion of the chute, as clearly shown in Figs. 1 and 2. One end of the strap is fixed to the rod or pole, and its other end is provided with an eye which is adapted to engage a suitable button 23, mounted on the rod or pole. After the chute is filled its contents may be discharged at will into a receptacle by unfastening the flexible strap.

The receiver is provided at its lower end with an outwardly-extending annular flange 24, forming a seat for the upper end of the chute, which is secured on the seat by means of a collar or band 25, preferably constructed of wire. The wire after passing around the receiver is looped around the upper end of the pole or rod at 26, as clearly illustrated in Fig. 4 of the drawings.

Having thus fully described my invention, what I claim as new, and desire to secure by Letters Patent, is—

1. A fruit-picker, comprising a pole, a chute mounted on the pole, and a longitudinal cushioning-strip also mounted on the pole and provided with a longitudinal series of projecting cushioning portions arranged to constrict the chute at different points throughout the length of the same, substantially as described.

2. A fruit-picker, comprising a rod or pole, a flexible chute connected with the rod or pole at opposite sides thereof, and a longitudinal cushioning-strip mounted on the rod or pole and extending longitudinally of and arranged at the back of the chute, substantially as described.

3. A fruit-picker, comprising a rod or pole, a flexible chute mounted on the rod or pole and secured to the same at opposite sides thereof, a flexible cushioning-strip mounted on the rod or pole and extending longitudinally of the chute, and provided at intervals with loops, and means carried by the pole for picking the fruit, substantially as described.

In testimony that I claim the foregoing as my own I have hereto affixed my signature in the presence of two witnesses.

JOHN B. MARSHALL.

Witnesses:
H. D. ADAMS,
P. SMITH.